June 29, 1965 J. P. FELBURN 3,191,966
SEMI-TRAILER WITH SHIFTABLE BOGIES AND FIFTH WHEEL
Filed Aug. 2, 1962 4 Sheets-Sheet 2
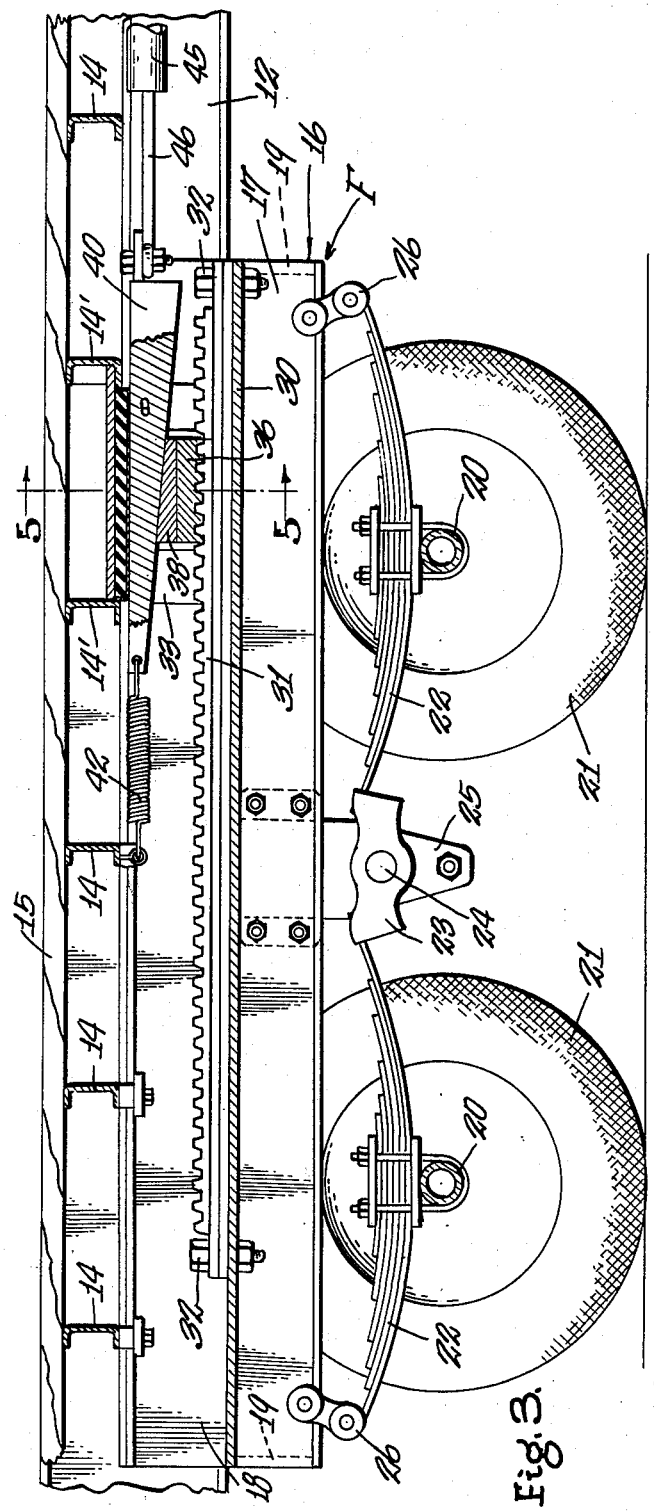
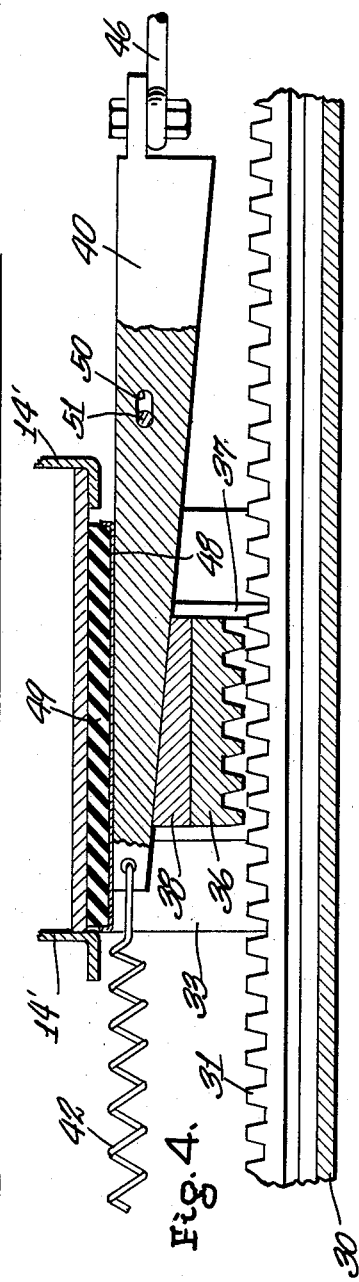
INVENTOR.
JOHN PHIL FELBURN
BY
ATTORNEYS

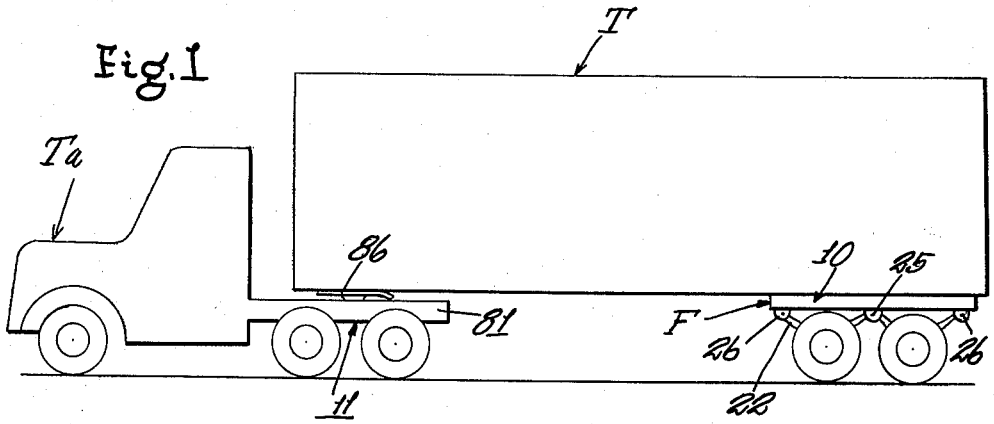
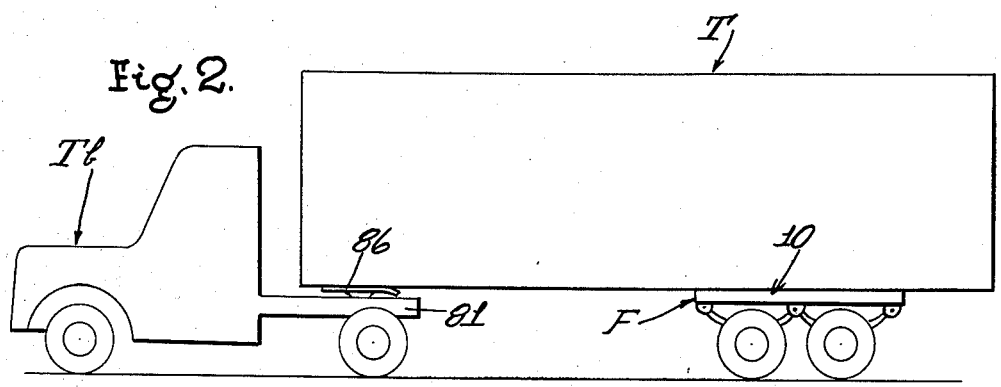
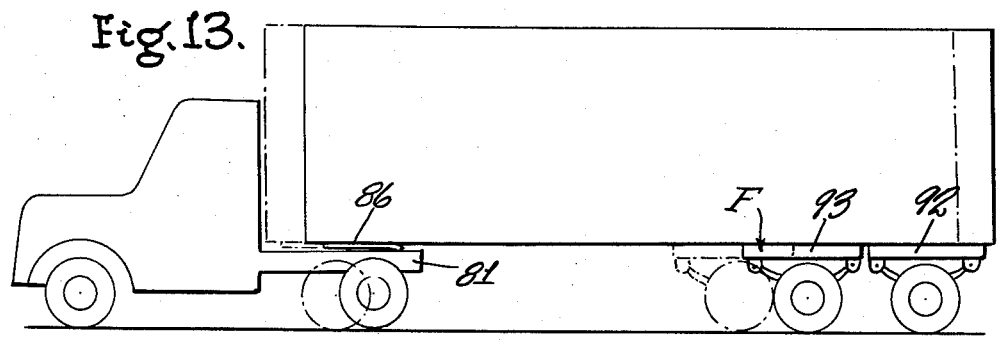

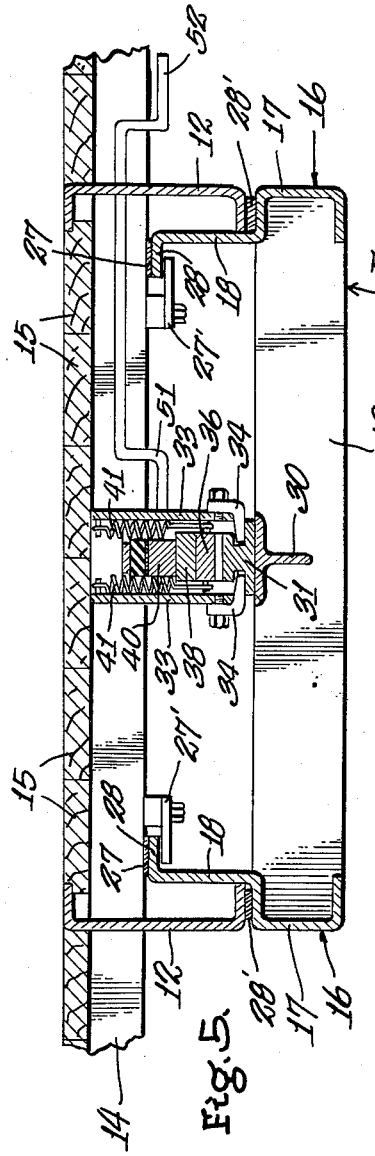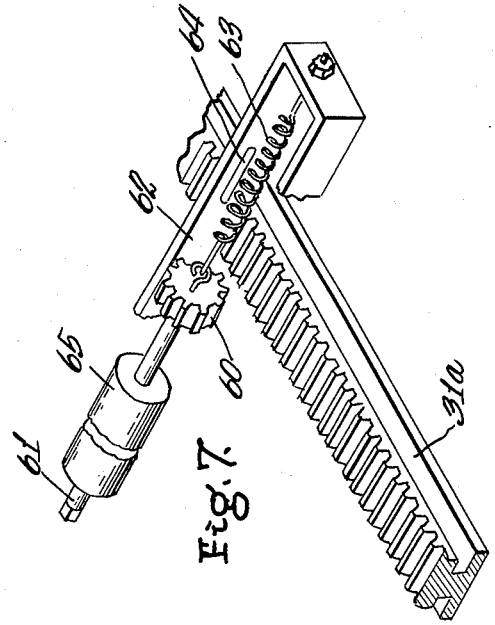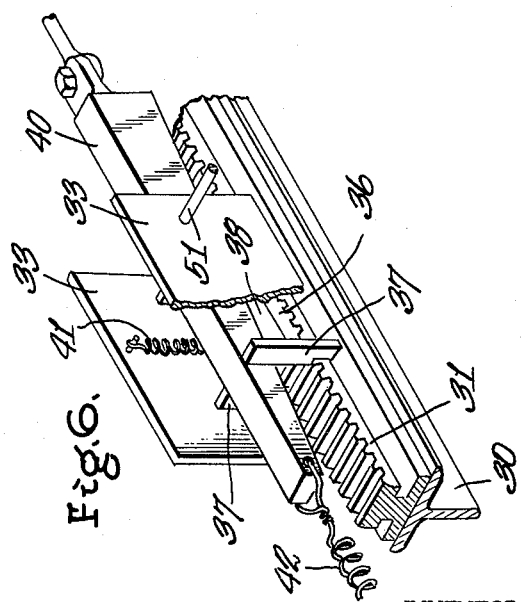

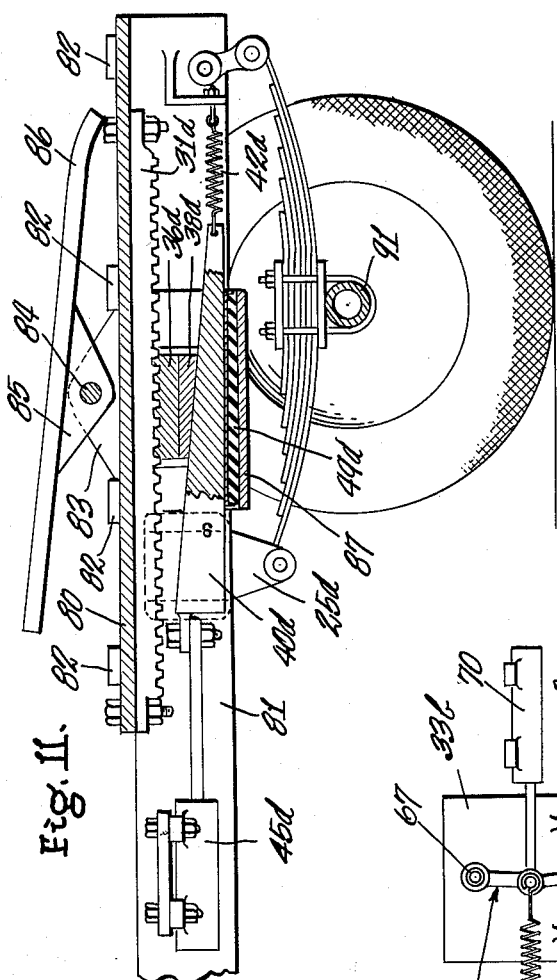

United States Patent Office 3,191,966
Patented June 29, 1965

3,191,966
SEMI-TRAILER WITH SHIFTABLE BOGIES
AND FIFTH WHEEL
John Phil Felburn, 4160 W. Broad St., Columbus, Ohio
Filed Aug. 2, 1962, Ser. No. 214,703
14 Claims. (Cl. 280—407)

My invention relates to vehicles, more particularly to wheel adjusting mechanism for use with tractor and trailer constructions, and the principal object of my invention is to provide new and improved constructions of this character.

The adjusting mechanism of my invention is particularly adapted for use with road hauling tractors and trailers and in this specification will be described in connection with the same, although it will be understood that the invention may be used in connection with other vehicles.

With reference to a load carrying trailer, such as the usual highway trailer for carrying freight, the mechanism includes one or more wheel bogies which are adapted to be shifted longitudinally of the trailer and, in certain embodiments, relative to each other. With respect to the tractor, the mechanism preferably supports the tractor fifth wheel so that the latter may be shifted longitudinally of the tractor, but also may include means for shifting the rear wheels of the tractor relative to the front wheels to thus change the wheel base.

The mechanism of my invention makes it possible to quickly and easily longitudinally adjust the trailer bogey and/or the tractor fifth wheel, and at the same time provides a positive lock to safely maintain the bogey or fifth wheel in adjusted position. Many advantages flow from use of the aforesaid mechanism and only a few will be hereinafter listed. For example, in the event the trailer is incorrectly loaded to place more weight at an undesirable place relative to the wheel bogey, the latter may be moved to another position relative to the trailer bed wherein the load is better supported, and this is considerably easier and less time consuming than to unload and then reload the trailer.

A further advantage flowing from my invention permits adjustment of the longitudinal distance between two sets of trailer wheels so that the axles of the wheel sets may be widely spread to increase permissible trailer loading or the axles of the wheel sets may be easily brought closer together when conditions, or local law, so dictate. Also, my invention makes it possible to change the wheel base of the tractor and/or trailer and thereby also change the overall length of the tractor-trailer rig, with attendant advantages. The foregoing, and other advantages, will be apparent as the description proceeds.

Further, various States have different gross weight limitations on their roads, and the trailer wheel bogey and/or the tractor fifth wheel may be adjusted, and various tractors may be connected, as the combination moves across State lines, to meet gross weight limitations, as will be more fully apparent from the following description.

In the drawings accompanying this specification and forming a part of this application, there are shown, for purpose of illustration, several embodiments which my invention may assume, and in these drawings:

FIGURES 1 and 2 schematically disclose a tractor and trailer combination showing use of my invention, FIGURES 3 is an enlarged, fragmentary longitudinal sectional view disclosing an embodiment of my invention, the parts being disclosed in locked position, FIGURE 4 is a further enlarged fragmentary longitudinal sectional view disclosing parts of the construction in unlocked relation, FIGURE 5 is a transverse sectional view corresponding generally to the line 5—5 of FIGURE 3, FIGURE 6 is a fragmentary perspective view of parts shown in FIGURES 3, 4 and 5, FIGURE 7 is a fragmentary perspective view showing another embodiment of my invention, FIGURE 8 is a fragmentary sectional view showing another embodiment of my invention, FIGURE 9 is a fragmentary side view of still another embodiment of my invention, FIGURE 10 is a sectional view corresponding generally to the line 10—10 of FIGURE 9, FIGURE 11 is a fragmentary longitudinal sectional view illustrating the embodiment of my invention shown in FIGURES 3 through 6 as applied to a tractor, FIGURE 12 is a fragmentary elevational view of parts similar to those shown in FIGURE 11, but showing a different embodiment, and FIGURE 13 schematically discloses my invention as applied to the adjustment of the wheel base of the tractor-trailer rig.

With respect to the drawings, FIGURE 1 shows a five axle rig, commonly called a tandem-tandem, in that the trailer T has a double-axle wheel bogey 10 and the tractor T has a double axle rear wheel unit 11. In some States, such for example, as States west of Chicago, a predetermined gross load limit is permitted, and the rig shown in FIGURE 1 is preferably used with the wheel bogey 10 near the rear of the trailer T.

In other States, such for example as States east of Chicago, lesser predetermined gross load limit is permitted, and the rig shown in FIGURE 2 is preferably used, with the wheel bogey 10 moved forward of the rear of the trailer T and a standard tractor Tb, having only a single rear axle, is combined therewith.

Thus, my invention enables use of proper freight moving apparatus, tailored to suit road loading requirements. Also, as before pointed out, my invention permits the balancing of the load in the event the trailer is improperly loaded. In FIGURE 13, changing of the axle spacing of both the trailer and tractor is illustrated, the full lines indicating one axle spacing and the dotted lines illustrating a changed spacing.

Referring particularly to FIGURES 3 through 6, the trailer therein illustrated comprises the usual pair of longitudinal main beams 12, 12 of channel section as shown in FIGURE 5. A plurality of cross sills 14 extend transversely of the beams 12. Each of the beams is formed with openings to closely pass the cross sills so that opposite ends of the latter extend beyond the beams, the cross sills being welded in place to provide a rigid structure. Planks 15 are laid across and secured to the cross sills 14 to form the bed of the trailer. A suitable van type body may be added in the event the load is to be enclosed.

The wheel bogey or unit comprises a pair of beams 16, 16, disposed longitudinally of but of less length than the main beams 12, 12, each beam 16 being of modified channel section to provide a channel portion 17 and an upstanding angle section 18, as best seen in FIGURE 5. Transverse members 19 may be welded or otherwise secured between the channel portions 17, at the forward and rear ends, as shown in FIGURE 3, and at suitable intermediate places if desired, so that the beams 16 and members 19 form a rigid, box-like frame F.

The double axles 20, 20 support wheels 21 at their opposite ends, the axles being supported from the beams 16, 16 by means of leaf springs 22, 22. Adjoining ends of the springs are slidably carried by an equalizer rocker 23 which is pivoted at 24 to hangers 25 which extend downwardly from the respective beams 16, 16. The outer ends of the springs 22, 22 may be connected to shackles 26 which are carried by respective beams.

The cross sills 14 have bearing surfaces 27 on the underside of those sills in the vicinity of the wheel bogey, these bearing surfaces cooperating with the upper flanges 28 of the angle section 18 of the beams 16 to support the load and to provide for adjustment of the box-like frame F (and connected wheels, axles, rocker and shackles) longitudinally of the main beams 12, 12. As best seen in FIGURE 5 the main beams hold the frame F against lateral movement and thus confine it to longitudinal movement. Further bearing surfaces 28' may be provided between lower flanges of the beams 12, 12, and holding toes 27' may be added to restrict vertical separation of the beams and the frame F.

An angle member 30, or other suitable support, is welded or otherwise secured in position to extend lengthwise of the frame F, perferably midway between the bogey beams 16, 16, as seen in FIGURE 5. A rack 31 is secured to the upper flange of the angle member 30, as by nuts and bolts 32 at opposite ends thereof. The rack 31 is of T cross-section for a purpose to appear later. Between a pair of cross sills, such as the sills 14', 14' in FIGURE 3, there extend a pair of metal plates 33, 33 which may be welded to the cross sills for rigid support. Toe plates 34 (see FIGURE 5) are bolted to the lower ends of the plates 33 and have a toe portion fitting within the space formed by the T section of the rack 31 to resist any lifting action at this portion of the latter.

A lock block 36, having teeth interfitting with the teeth of the rack 31, is disposed over the rack and held to vertical sliding movement by abutments which abut opposite ends of the lock block. One of these abutments is shown in detail in FIGURE 6 and comprises a pair of brackets 37, 37 welded to opposite inner sides of the plates 33. The rack 31 is preferably as wide as the lock block 36 and a wedge block 38 is also of the same width and length as the lock block. Each bracket 37 is notched to freely pass the rack 31, the unnotched portion of each bracket providing a stop against which the respective ends of the lock and wedge blocks abut, thus limiting these blocks to vertical movement within the plates 33.

A wedge 40 of considerably longer length than the wedge block 38 is provided for cooperation with the latter, these parts having mating inclined surfaces so that in the position of parts shown in FIGURE 3 the lock block is held in meshed engagement with the teeth of the rack, whereas in the position of parts shown in FIGURE 4, the lock block 36 is lifted from engagement with the rack teeth. As best seen in FIGURE 5, the lock block 36 is provided with studs which extend from opposite sides thereof, these studs being connected to the lower end of a pair of springs 41, the upper ends of the springs being connected to a pair of studs extending inwardly from the plates 33, 33. The springs constantly exert a powerful upward pull on the lock block 36 so as to lift the latter free of engagement with the rack 31 when the wedge 40 has been shifted to permit upward movement of the wedge block 38 through the lifting action applied to the lock block.

A powerful spring 42 is connected between a cross sill 14 and the small end of the wedge 40 and tends to exert a constant pull on the wedge (to the left as viewed in FIGURES 3 and 4) so that the latter is urged to position wherein it holds the lock block in mesh with the rack 31 and thus locks the frame against movement with respect to the trailer bed. A fluid cylinder 45, connected to a cross sill (not shown) has its piston rod 46 connected to the large end of the wedge. The cylinder 45 may be air operated and may be connected to the air system of the tractor, a suitable valve (not shown) being interposed in the air line to control flow of air to the rod end of the cylinder, or to exhaust air from this cylinder end. When air is supplied to the rod end of the cylinder, the wedge 40 is pulled to the right (as viewed in FIGURES 3 and 4), to permit lifting of the wedge and lock blocks through upward pulling action of the springs 41, 41, thus effecting release of the lock block 36 from meshing engagement with the rack. When air is exhausted from the rod end of the cylinder 45, the spring 42 pulls the wedge to the left (as viewed in FIGURES 3 and 4) to urge the lock block 36 to meshing engagement with the rack.

The wedge 40 slides against the metal lining 48 of a rubber block 49 so that some resiliency is provided to permit lining up of the teeth of the rack 31 and lock block 36 and thus avoiding jamming of these teeth. The wedge 40 has a slightly elongated hole 50 for receiving a locking rod 51. The rod 51 slidably extends through holes in the plates 33 and, as seen in FIGURE 5, has an offset portion which extends through a hole in one of the bed beams 12 and terminates in an outer handle 52. With the rod 51 within the wedge hole 50, the wedge 40 is locked against movement from the position wherein it holds the lock block 36 in mesh with the rack 31, despite any urging force which might be applied to the wedge by inadvertent operation of the air cylinder 45. Further, since the rod 51 holds the wedge in locking position, a safety feature is provided in the event the spring 42 should break or loose its pulling power. The rod 51 may be removed from wedge locking position by a pulling force applied by an operator on the handle 52.

Thus, to release the wheel bogey for adjustment longitudinally of the trailer bed, the rig operator pulls the rod 51 outwardly to release it from the wedge hole 50, and then applies air to the rod end of the cylinder 45 to pull the wedge to the right. The springs 41, 41 will lift the lock block 36 from engagement with the rack and the wheel bogey is then free to move longitudinally of the trailer bed. The bogey wheels 21 may then be blocked, or the brakes may be set on these wheels so that the wheel bogey is held stationary. Thereafter, the operator may actuate the tractor to push (or pull) on the trailer bed and cause it to ride over the wheel bogey until the latter is in the desired longitudinal relation with respect to the trailer bed. Air is then exhausted from the cylinder 45 so that the springs 42 will pull the wedge 40 to its locking position, and the rod 51 is inserted into the wedge hole 50. The rig is now ready for operation.

In the embodiment shown in FIGURE 7, the wedge construction is omitted and a locking gear 60 takes its place. Instead of a gear, a lock block like that previously described, may be used. The rack 31a may be similar to the rack 31 and may be similarly supported. The gear 60 is held to sliding movement transversely of the rack 31a by means of a slide box 62 which may be supported from a cross sill (not shown) and a tension spring 63 is interposed between the gear and the slide box to constantly exert a powerful pull on the gear and thus urge it to meshing engagement with the rack 31a and thereby lock the wheel bogey against movement. Any suitable means may be provided to lock the gear 60 against rotation, such as a spline 64 on the slide box 62 which mesh with teeth on the gear. An air cylinder 65 is provided to positively retract the gear 60 from mesh with the rack 31a to release the wheel bogey for adjustment relative to the trailer bed.

As seen in FIGURE 7, the gear is about one-half the width of the rack 31a and the splines 64 are disposed to extend to alignment with the midway line of the rack. Thus, as the gear meshes with the rack teeth at the side nearest the gear, the splines 64 will not engage the gear teeth. The gear may therefore be rotated by a crank applied to a squared end of the piston rod 61. Since the gear cannot move in the longitudinal direction of the rack by reason of its confinement in the slide box 62, the rack 31a is moved longitudinally to effect adjustment of the bogey frame F longitudinally of the trailer bed.

When the gear 60 is moved, by the cylinder 65, to mesh with the rack teeth portion farthest from the gear, the splines 64 will engage with the gear and lock the rack against longitudinal movement.

In the embodiment shown in FIGURE 8 a rack 31b is provided, this rack being similar to the rack 31 and similarly supported. Plates 33b (only one of which is shown) are provided, similar to the plates 33, and abutment brackets 37b extend inwardly from the plates 33b and, as before, permit longitudinal movement of the rack but hold a lock block 36b to vertical movement. A toggle joint 66 is provided for moving the lock block 36b, one end of one toggle lever being pivotally connected to the lock block and the end of the other lever being pivotally connected to the plates 33b. A rubber bushing 67 forms part of each pivotal connection to provide the same function as the rubber block 49.

A tension spring 68 is connected between a support 69 and the center or knee of the toggle joint and exerts a powerful pull to hold the toggle joint in the locked position shown in FIGURE 8 wherein the lock block 36b is held in mesh with the rack 31b to hold the wheel bogey against movement. An air cylinder 70, supported from a cross-sill (not shown) is adapted to break the toggle by pulling the toggle center to the right (as viewed in FIGURE 8) and thus lift the lock block 36b from meshing engagement with the rack.

A further embodiment of my invention is shown in FIGURES 9 and 10 of the drawings. In this embodiment, the rack 31c is secured, as before, to the wheel bogey frame F, but differs from the previously described rack 31 in that it has upper and lower tracks 71, 72. As seen in FIGURE 10, the lower track 72 extends the full width of the rack whereas the upper track extends for only half the rack width.

A spur gear 73 is adapted to mesh with both upper and lower tracks 71, 72 and when in mesh with both tracks the gear locks the rack 31c against movement. The gear 73 has a shaft 74 which passes through journals 75, 76 formed on plates 33c which, like plates 33, are secured to cross sills 14 of the trailer bed. The journal 76 has an end flange 77 to which is attached an air cylinder 78 and the right hand end of the gear shaft 74 is connected to the piston (not shown) which works within the cylinder. The left hand end of the gear shaft 74 is formed with a crank receiving end 78.

The cylinder 78 may be of the usual double acting type so that air introduced at the rod end will cause shifting of the gear 73 to the right to engagement only with the track 72. A crank applied to the shaft end 78, and rotated, will cause relative sliding movement between the wheel bogey and the trailer base in a direction longitudinally of the latter. When air is introduced at the blank end of the cylinder and air exhausted from the rod end, the gear will be shifted to meshing engagement with both tracks 71, 72 and the wheel bogey will be locked to the trailer base. The cylinder 78, instead of being of the double acting type, may be of the well known spring-return type.

FIGURE 11 discloses an embodiment of my invention as applied to the supporting of a tractor fifth wheel for selected sliding movement longitudinally of the tractor frame. In this construction a plate or frame 80 is disposed to span and overlie the two longitudinal frame members 81 of the tractor. The plate 80 is held to longitudinal sliding movement by side slide-guides 82 carried by respective frame members 81. Ribs 83 extend upwardly from the plate 80 and support a cross shaft 84 which extends therebetween. Ribs 85 extend downwardly from the fifth wheel 86 and the shaft 84 extends through openings in the ribs to provide for the usual tilting movement of the fifth wheel.

The rack 31d in the construction shown in FIGURE 11 is secured to the undersurface of the plate 80, whereas the side plates 33d are secured to the tractor frame members 81 for disposition in the closely spaced relation shown with respect to the plates 33 of FIGURE 5. In the construction of FIGURE 11, the plates 33d have a lower connecting web 87 to support the metal-shielded rubber block 49d.

The rack 31d is disposed between the plates 33d, as before, and a lock block 36d and a wedge block 38d are supported for cooperation with a wedge 40d. The wedge 40d is held in locking position by a spring 42d and an air cylinder 45d is provided to shift the wedge 40d to unlocking position. Although not shown, it will be appreciated that springs, like the springs 41, will provide for downward movement of the lock block 36d when the wedge 40d has been shifted to unlocking position.

In the construction shown in FIGURE 11 the spring hangers 25d are connected to the frame members 81 of the tractor, so that longitudinal adjustment of the plate or frame 80 effects adjustment only of the fifth wheel 86 longitudinally of the tractor. In the embodiment shown in FIGURE 12, the spring hangers 25e are connected to plates 90 which are rigid with and extend downwardly from opposite sides of the plate or frame 80. In this embodiment the rear shackles (not shown) are connected to hangers extending downwardly from the rear side portions of the plate 80. Therefore, in this embodiment, when the plate 80 is shifted longitudinally both the fifth wheel 86 and the rear axle 91 are shifted longitudinally of the tractor frame. It will be appreciated that shifting of the axle 91 will change the wheel base of the trailer.

Referring to FIGURE 13, the rear wheels of the tractor Tb are shown in full lines in one position and in dotted lines in another position wherein the rear axle 91 has been moved closer to the front axle. This, it will be appreciated, shortens the wheel base of the tractor and results in a shortening of the overall length of trailer-tractor rig. It will be appreciated that the drive shaft of the tractor will incorporate the usual splined connection, possibly modified to permit longer adjustment of the length of the drive shaft.

In FIGURE 13, the trailer bed is provided with two bogeys 92, 93. The bogey 92 may be fixed against longitudinal relative movement with respect to the trailer bed, whereas the bogey 93 may be mounted for selective longitudinal movement in accordance with the construction shown in FIGURES 1 through 10.

The bogeys 92, 93 are shown in full lines as being relatively close together so that the tires thereon will skid just slightly when the trailer is turned. The disadvantage in this adjustment lies in the fact that the load is concentrated on a lesser portion of the roadway and this has been held objectionable in certain States.

The bogey 93 is shown in dot-dash lines as moved to a position farther removed from the bogey 92 to provide a wide-spread axle effect and thus distribute the load over a greater portion of the roadway. The disadvantage in this adjustment lies in the fact that the tires will skid as the trailer is turned, causing excessive tire wear. However, through use of proper adjustment of the bogeys relative to each other, the bogeys may be disposed close together to reduce turn skids in States where load concentration is not objected to, and may easily be disposed farther apart to meet the road loading requirements of other States.

Instead of fixing the bogey 92 to the trailer bed against relative longitudinal adjustment, this bogey may also be mounted for selective adjustment to incorporate the advantages of the construction shown in FIGURES 1 through 10 with the advantages of relatively adjustable bogeys.

In view of the foregoing, it will be apparent to those skilled in the art that I have accomplished at least the principal object of my invention and it will also be apparent to those skilled in the art that the embodiments herein described may be variously changed and modified, without departing from the spirit of the invention, and that the invention is capable of uses and has advantages not herein specifically described; hence it will be appreciated that the herein disclosed embodiments are illustrative only, and that my invention is not limited thereto.

I claim:

1. A wheeled vehicle construction, comprising a pair of frames, one for the bed of the vehicle and the other for the wheels of the latter, said frames being connected for relative sliding movement in a direction longitudinally of said vehicle so that said wheels may be disposed at selected positions longitudinally of said vehicle bed, a toothed rack fixed to one of said frames and disposed in said direction longitudinally of said vehicle, a toothed locking member carried by the other of said frames with its teeth directed toward the teeth of said rack, said locking member being held to vertical sliding movement toward and away from the teeth of said rack, wedge means for moving and holding said locking member in meshing interengagement with said rack to thereby lock said frames against sliding movement, and means for moving said wedge means to a position wherein said locking member may be moved from said meshing interengagement and thereby provide for relative sliding movement of said frames.

2. The construction according to claim 1 wherein the last named means comprises a fluid cylinder for shifting said wedge means.

3. The construction according to claim 1 wherein said wedge means comprises a slidable wedge member in juxtaposed relation with said rack, said wedge member being slidable against a resilient backing so that enough play is provided to enable the teeth of said rack and said locking member to mesh even though they may be initially slightly out of meshing alignment.

4. The construction according to claim 1 wherein the last named means comprises a fluid cylinder, and further including spring means for constantly exerting a force on said locking member to urge it in a direction away from meshing interengagement with said rack, and further spring means for constantly exerting a force to urge said wedge means in the direction to move and hold said locking member in said meshing interengagement.

5. The construction according to claim 4 and further including a safety lock comprising a rod held to movement transversely of said wedge means and selectively inserted into a hole in the latter to hold the same against movement.

6. A wheeled vehicle construction, comprising a pair of frames, one for the bed of the vehicle and the other for the wheels of the latter, said frames being connected for relative sliding movement in a direction longitudinally of said vehicle so that said wheels may be disposed at selected positions longitudinally of said vehicle bed, a toothed rack fixed to one of said frames and disposed in said direction longitudinally of said vehicle, a toggle joint including a pair of pivotally connected levers, the free end of one lever being pivotally fixed to the other of said frames and the free end of the other of said levers pivotally carrying a toothed locking member which is movable toward and into meshing interengagement with said rack when said levers are in toggle making position to thereby lock said frames against sliding movement, said locking member being withdrawn from said meshed interengagement when said levers are in toggle breaking position.

7. The construction according to claim 6 and including a spring member which constantly applies a force to said toggle joint to urge said levers to toggle making position, and further including a fluid cylinder for selectively overpowering said spring member and moving said levers to toggle breaking position.

8. A wheeled vehicle construction, comprising a pair of frames, one for the bed of the vehicle and the other for the wheels of the latter, said frames being connected for relative sliding movement in a direction longitudinally of said vehicle so that said wheels may be disposed at selected positions longitudinally of said vehicle bed, a rack member fixed to one of said frames and disposed in said direction longitudinally of said vehicle, said rack member having vertically spaced teeth tracks, one of which is wider than the other, a rotatable gear held to shifting movement transversely of said rack member, in one position in meshing interengagement with the teeth of both tracks to thereby lock said frames against sliding movement, and in other position in meshing interengagement with the teeth of only one of said tracks, and crank means for rotating said gear when the latter is in said other position for effecting sliding movement of said frames.

9. A power tractor, having a longitudinally extending frame and sets of wheels at the front and rear of said frame, an auxiliary frame supported on the rear portion of said tractor frame for sliding movement in a direction longitudinally of said tractor frame, a fifth wheel carried by said auxiliary frame and adapted to be connected to the fifth wheel plate of a trailer to be towed by said tractor, a gear rack carried by said auxiliary frame and disposed lengthwise in said longitudinal direction, the teeth of said rack pointing downwardly, a toothed lock block underlying said rack and mounted on said tractor frame and held to vertical movement, the teeth of said lock being directed toward the teeth of said rack, and wedge means for moving and holding said lock block in meshed interengagement with said rack to thereby hold said auxiliary frame against sliding movement on said tractor frame.

10. A vehicle construction comprising a pair of frames connected for relative sliding movement, a toothed rack carried by one of said frames, a gear carried by the other of said frames and engaged with said rack, rotation of said gear effecting relative movement between said gear and said rack in a direction longitudinally of the latter and said gear being axially shiftable between two positions and in each being engaged with said rack, an abutment adjacent said gear and in one position of said gear said abutment being engaged with one or more gear teeth to prevent gear rotation and consequent gear and rack relative movement aforesaid and in the other position of said gear said abutment being disengaged from said gear teeth to provide for gear rotation, and means for shifting said gear axially away from engagement with said abutment to provide for gear rotation and consequent gear and rack relative movement aforesaid.

11. The construction of claim 10 wherein spring means effects axial movement of said gear to said one gear position and wherein a fluid cylinder opposes said spring and effects axial gear movement to its said other position.

12. The construction of claim 10 wherein said abutment comprises a second toothed rack generally co-extensive with and in opposed, fixed relation with said first rack.

13. The construction of claim 12 wherein the teeth of said second rack are narrower than the teeth of said first rack to provide for disengagement of said gear therefrom when the latter is in its said other position.

14. The construction of claim 13 wherein spring means effects axial movement of said gear to said one gear position and wherein a fluid cylinder opposes said spring and effects axial gear movement to its said other position.

References Cited by the Examiner

UNITED STATES PATENTS

| | | | |
|---|---|---|---|
| 1,887,118 | 11/32 | Collinge | 280—407 |
| 2,365,884 | 12/44 | Kucera | 280—405 X |
| 2,589,678 | 3/52 | De Lay | 280—407 |
| 2,976,051 | 3/61 | Morey | 280—81 |
| 2,985,463 | 5/61 | Geerds | 280—407 |

A. HARRY LEVY, *Primary Examiner.*

LEO FRIAGLIA, *Examiner.*